United States Patent Office 3,168,482
Patented Feb. 2, 1965

3,168,482
PROCESS FOR THE REMOVAL OF NICKEL, IRON, AND VANADIUM FROM A SILICA BASED CRACKING CATALYST
Arvin D. Anderson, Park Forest, Emmett H. Burk, Jr., Hazel Crest, Larry L. Simantel, Harvey, and Robert A. Sanford, Homewood, Ill., assignors, by mesne assignments, to Sinclair Research, Inc., New York, N.Y., a corporation of Delaware
No Drawing. Filed Aug. 5, 1960, Ser. No. 47,598
16 Claims. (Cl. 252—415)

This invention is a method for the removal of poisoning metals from synthetic gel hydrocarbon conversion catalysts. The method is useful in conjunction with hydrocarbon conversion processes where the feed is contaminated with nickel, and one or more of iron and vanadium compounds. The method comprises removing the catalyst containing metal contaminants from the hydrocarbon conversion, treating the catalyst with hydrogen at an elevated temperature during which nickel contaminant is reduced to the elemental state, then treating the catalyst, preferably under elevated pressure and at a lower temperature with carbon monoxide, during which nickel carbonyl is formed and flushed off the catalyst surface. Some iron contaminant is also removed. This demetallized catalyst is then returned to the hydrocarbon conversion process. The amount of nickel removed in the method of the invention may be enhanced by sulfiding the catalyst before hydrogenation is begun.

The invention also comprises a more elaborate procedure for the removal of iron, nickel and vanadium, the hydrocarbon conversion catalyst contaminants most frequently encountered. In such an elaborated process, the catalyst, after use in hydrocarbon conversion and regeneration to a substantially carbon-free condition is treated at an elevated temperature with a molecular oxygen-containing gas, then is sulfided at an elevated temperature, subjected to a chlorinating vapor, hydrogenated at an elevated temperature and treated with CO. After carbonylation, the catalyst, having a reduced content of poisoning metals is returned to the hydrocarbon conversion system. Although it has been suggested, for example, in U.S. Patent No. 2,575,258, that the use of either hydrogen or carbon monoxide on a catalyst poisoned with iron may mask poisoning activity in further cracking, it has been found highly advantageous to use first hydrogen and then CO at a lower temperature to actually remove nickel as the carbonyl. Most proposed processes of catalyst demetallization require, at least in some stage of the process, contact between the catalyst and an aqueous medium. Such contact brings about expensive heat losses and may damage the catalyst if not handled properly. Manipulative disadvantages also accrue from the handling of aqueous slurries of finely divided catalysts. In this invention, however, particularly when chlorination is employed, removal of all the major contaminants, iron, nickel and vanadium, is possible without any liquid phase operations.

Catalytically promoted methods for the chemical conversion of hydrocarbon include cracking, hydrocracking, reforming, hydroforming, coking, deasphalting, etc. Such reactions generally are performed at elevated temperatures, for example, about 300 to 1200° F., more often 600 to 1000° F. Feedstocks to these processes comprise normally liquid and solid hydrocarbons which at the temperature of the conversion reaction are generally in the fluid, i.e., liquid or vapor, state and the products of the conversion frequently are lower-boiling materials.

In particular, cracking of heavier hydrocarbon feedstocks to produce hydrocarbons of preferred octane rating boiling in the gasoline range is widely practiced and uses a variety of solid oxide catalysts to give end products of fairly uniform composition. Cracking is ordinarily effected to produce gasoline as the most valuable product and is generally conducted at temperatures of about 750 to 1100° F., preferably about 850 to 950° F., at pressures up to about 2000 p.s.i.g., preferably about atmospheric to 100 p.s.i.g., and without substantial addition of free hydrogen to the system. In cracking, the feedstock is usually a mineral oil or petroleum hydrocarbon fraction such as straight run or recycle gas oils or other normally liquid hydrocarbons boiling above the gasoline range.

Solid oxide catalysts have long been recognized as useful in catalytically promoting conversion of hydrocarbons. For cracking processes, the catalysts which have received the widest acceptance today are usually activated or calcined predominantly silica or silica-based, e.g., silica-alumina, silica-magnesia, silica-zirconia, etc., compositions in a state of slight hydration and containing small amounts of acidic oxide promoters in many instances. The oxide catalyst may be alumina- or silica-based and ordinarily contains a substantial amount of a gel or gelatinous precipitate comprising a major portion of silica and at least one other material, such as alumina, zirconia, etc. These oxides may also contain small amounts of other inorganic materials, but current practice in catalytic cracking leans more toward the exclusion from the silica hydrate materials of foreign constituents such as alkaline metal salts which may cause sintering of the catalyst surface on regeneration and a drop in catalytic activity. For this reason, the use of wholly or partially synthetic gel catalysts, which are more uniform and less damaged by high temperatures in treatment and regeneration, is often preferable. Popular synthetic gel cracking catalysts generally contain about 10 to 30% alumina. Two such catalysts are "Aerocat" which contains about 13% $Al_2O_3$, and "High Alumina Nalcat" which contains about 25% $Al_2O_3$, with substantially the balance being silica. The catalyst may be only partially of synthetic material; for example, it may be made by the precipitation of silica-alumina on a clay, such as kaolinite or halloysite. One such semi-synthetic catalyst contains about equal amounts of silica-alumina gel and clay.

The manufacture of synthetic gel catalysts can be performed, for instance (1) by impregnating silica with alumina salts; (2) by direct combination of precipitated (or gelated) hydrated alumina and silica in appropriate proportions; or (3) by joint precipitation of alumina and silica from an aqueous solution of aluminum and silicon salts. Synthetic catalysts may be produced by a combination of hydrated silica with other hydrate bases as, for instance, zirconia, etc. These synthetic gel type catalysts are activated or calcined before use.

The physical form of the catalyst varies with the type of manipulative process to which it will be exposed. In a fixed-bed process, a series of catalytic reactors may be used, some being on stream and others in the process of cleaning, regeneration, etc. In circulating catalyst systems, such as those of the fluid catalytic and "TCC" processes, catalyst moves through a reaction zone and then through a regeneration zone. In the fluid process, gases are used to convey the catalyst and to keep it in the form of a dense turbulent bed which has no definite upper interface between the dense (solid) phase and the suspended (gaseous) phase mixture of catalyst and gas. This type of processing requires the catalyst to be in the form of a fine powder, generally in a size range of about 20 to 150 microns. In the "TCC" or "Thermofor" process the catalyst is in the form of beads which are conveyed by elevators. Generally these beads may range in size up to about ½" in diameter. When fresh, the minimum sized bead is generally about ⅛". Other types of process use other forms of catalyst such as tablets or extruded pellets.

One of the most important phases of study in the improvement of catalyst performance in hydrocarbon conversion is in the area of metals poisoning. Although referred to as "metals," these catalyst contaminants may be in the form of free metals or relatively non-volatile metal compounds. It is to be understood that the term "metal" used herein refers to either form. Various petroleum stocks have been known to contain at least traces of many metals. In addition to metals naturally present, including some iron, petroleum stocks have a tendency to pick up tramp iron from transportation, storage and processing equipment. Most of these metals, when present in a stock, deposit in a relatively non-volatile form on the catalyst during the conversion processes so that regeneration of the catalyst to remove coke does not remove these contaminants.

Of the various metals which are to be found in representative hydrocarbon feedstocks some, like the alkali metals, only deactivate the catalyst without changing the product distribution; therefore they might be considered true poisons. Others such as iron, nickel, vanadium, and copper markedly alter the selectivity and activity of cracking reactions if allowed to accumulate. A poisoned catalyst generally produces a higher yield of coke and hydrogen at the expense of desired products, such as gasoline and butanes. For instance, it has been shown that the yield of gasoline, based on cracking feed disappearance to lighter materials dropped from 93 to 82% when the laboratory-measured coke factor of a catalyst rose from 1.0 to 3.0 in commercial cracking of a feedstock containing some highly contaminated stocks. Since many cracking units are limited by coke burning or gas handling facilities, increased coke or gas yields require a reduction in conversion or throughput to stay within the unit capacity.

An alternative to letting catalyst metals level increase and activity decrease is to diminish the overall metals content by raising catalyst replacement rates. Either approach, letting metals level increase, or increasing catalyst replacement rates, must be balanced against product value and operating costs to determine the most economic way of operating. The optimum metal level at which to operate any cracking unit will be a function of many factors including feedstock metal content, type and cost of catalyst, overall refinery balance, etc., and can be determined only by a comprehensive study of the refinery's operations.

A further alternative, demetallizing the catalyst, which avoids discarding of expensive catalyst, and enables much lower grade, highly metals-contaminated feedstocks to be used, is now possible in this invention. In the process a catalyst contaminated with nickel by use in converting a nickel-containing petroleum feedstock may be treated only for nickel removal, or the catalyst may be treated for iron and/or vanadium removal as well.

Commercially used cracking catalysts are the result of years of study and research into the nature of cracking catalysts, and the cost of these catalysts is not negligible. The cost frequently makes highly poisoned feedstocks less desirable to use in cracking operations, even though they may be in plentiful supply, because of their tendency to damage the expensive catalysts. The expense of such catalysts, however, is justified because the composition, structure, porosity and other characteristics of such catalysts are rigidly controlled so that they may give optimum results in cracking. It is important therefore, that removing poisoning metals from the catalyst does not jeopardize the desired chemical and physical constitution of the catalyst. Although methods have been suggested in the past for removing poisoning metals from a catalyst which has been used for high-temperature hydrocarbon conversions, for example, the processes of U.S. Patents 2,488,718; 2,488,744; 2,668,798 and 2,693,455, the severity of prior art demetallizing conditions has been criticized in U.S. Patent 2,901,419. This latter patent, along with a number of other patents seeks to solve the problem of metal poisoned catalysts by adding inhibiting or masking materials to the poisoned catalyst. There is a limit, of course, to just how much of such materials may be allowed to accumulate on a catalyst. However, the process of this invention is effective to remove nickel and other metals without endangering the expensive catalyst.

In this invention, the hydrocarbon petroleum oils utilized as feedstock for a conversion process may be of any desired type normally utilized in catalytic conversion operations. This feedstock contains poisoning metals, sometimes as much as 3%, and the catalyst may be used as a fixed, moving or fluidized bed or may be in a more dispersed state. For typical operations, the catalytic cracking of the hydrocarbon feed would normally result in a conversion of about 50–60 percent of the feedstock into a product boiling in the gasoline boiling range. The catalytic conversion system can also include a regeneration procedure in which the catalyst is contacted periodically with free oxygen-containing gas in order to restore or maintain the activity of the catalyst by removing carbon. It will be understood that in this specification and claims "regeneration" refers to this carbon burn-off procedure. In the process of this invention, regeneration of any particular quantum of catalyst is generally continued until the carbon content is less than about 5.0%, preferably less than about 0.5%.

The metal-poisoned catalyst preferably after regeneration, is subjected to the high temperature hydrogen treatment.

Hydrogenation of the contaminated catalyst removed from the hydrocarbon conversion system takes place at a temperature of about 800° F. to 1600° F., the choice of reduction conditions depending upon the extent of metal poisoning and the stability of the catalyst toward high temperatures. The pressure of the hydrogenation system may vary from atmospheric pressure or less up to about 1000 p.s.i.g., the upper pressure limit preferably being about 15 p.s.i.g. A temperature of about 1100 to 1300° F. is preferred and the hydrogenation is continued until surface accumulations of poisoning metals, particularly nickel, are substantially reduced to the elemental state. This may take up to about 24 or more hours, more likely about 1–6 hours. The hydrogenating vapor contains about 10 to 100% free hydrogen, preferably no less than about 80 mole percent free hydrogen. The rest may be any inert gas. Preferably the hydrogenating vapor is anhydrous, that is, no separate aqueous phase appears if the vapor is converted to the liquid state.

Carbonylation takes place at a temperature substantially lower than the hydrogenation, from about ambient temperature to 300° F. maximum and preferably at an elevated pressure.

The carbonylation gas contains usually about 50–100 mole percent carbon monoxide, the remainder being preferably an inert diluent gas such as nitrogen or carbon dioxide. The gas preferably contains at least about 90 mole percent CO and is flowed over the catalyst for up to 24 or more hours at a pressure which can range up to about 1000 or 2000 p.s.i.g. A pressure of up to about 800 p.s.i.g. and a contact time of about 1–6 hours are preferred. The temperature of contacting is preferably about 100–180° F.

The purging of the catalyst containing reduced contaminating metals with CO generally serves both to convert the elemental metals, especially nickel and iron to volatile carbonyls and to remove the carbonyls. Where nickel is the predominant poisoning metal, the process serves for rather complete removal of this metal from the surface of the catalyst and gives a product of greatly increased favorable activity in a subsequent hydrocarbon conversion. However, the process of the invention gives greater removal of nickel from poisoned catalyst when sulfiding is performed before hydrogenation. The sulfiding step can be performed by contacting the poisoned catalyst with elemental sulfur vapors, or more conveniently by contacting the regenerated poisoned catalyst with a volatile sulfide, such as $H_2S$, $CS_2$ or a mercaptan. The contact with the sulfur-containing vapor can be performed at a pressure from atmospheric to about 1000 p.s.i.g. and an elevated temperature generally in the range of about 500 to 1500° F., preferably about 800 to 1300° F. Other treating conditions can include a sulfur-containing vapor partial pressure of about 0.1 to 30 p.s.i.g. or more, preferably about 0.5–15 p.s.i.g. Hydrogen sulfide is the preferred sulfiding agent. The sulfiding gas may contain about 10 to 100 mole percent $H_2S$, preferably at least about 80 mole percent $H_2S$. Pressures below atmospheric can be obtained either by using a partial vacuum or by diluting the vapor with gas such as nitrogen or hydrogen. The time of contact may vary on the basis of the temperature and pressure chosen and other factors such as the amount of metal to be removed. The sulfiding may run, for, say, up to about 24 hours or more depending on these conditions and the severity of the poisoning. Usually about 1–6 hours is a sufficient time. Temperatures of about 900 to 1200° F. and pressures approximating 1 atmosphere or less seem near optimum for sulfiding and this treatment often continues for at least 1 or 2 hours but the time, of course, can depend upon the manner of contacting the catalyst and sulfiding agent and the nature of the treating system, e.g., batch or continuous, as well as the rate of diffusion of sulfiding agent within the catalyst matrix.

Where a poisoned catalyst is to be treated for the removal of vanadium and additional iron, as well as nickel, a high temperature treatment with oxygen-containing gas can be performed, preferably before sulfiding. Ordinarily the catalysts are treated before the poisoning metals have reached an undesirably high level, for instance, about 2%, generally no more than about 1%, maximum, content of any one poisoning metal. Prior to other treatments subjecting the poisoned catalyst sample to magnetic flux may be found desirable to remove any tramp iron particles which may have become mixed with the catalyst. When oxygen treatment is employed in the process of this invention, the regeneration of any particular quantum of catalyst is generally continued until the carbon content is less than about 0.5%.

Treatment of the regenerated catalyst with molecular oxygen-containing gas is described in copending application Serial No. 19,313, filed April 1, 1960, now abandoned, hereby incorporated by reference. The temperature of this treatment is generally in the range of about 1000° F. to 1600° F. or more. Little or no effect on vanadium removal is accomplished by treatment below about 1000° F., even for an extended time. The upper limit, to avoid catalyst damage, will usually be below about 1800° F. Preferably a temperature of about 1200–1400° F. is used and a pressure from atmospheric to about 1000 p.s.i.g., preferably up to about 15 p.s.i.g. is imposed. In general the oxygen treatment may last for about 24 or more hours, preferably for about 1–6 hours. If any significant amount of carbon is present at the start of this high-temperature treatment, the essential oxygen contact is that continued after carbon removal. In any event, after carbon removal, the oxygen treatment of the essentially carbon-free catalyst is at least long enough to convert a substantial amount of vanadium to a higher valence state, as evidenced by a significant increase, say at least about 10%, preferably at least about 100%, in the vanadium removal in subsequent stages of the process. The duration of the treatment and the amount of vanadium prepared by the treatment for latter removal is dependent on the temperature and characteristics of the equipment used. The length of the treatment may vary from the short time necessary to produce an observable effect to a time just long enough not to damage the catalyst. In general, the time is inversely variable with the temperature employed.

The oxygen-containing gas used in the treatment contains molecular oxygen as the essential active ingredient. The gas may be oxygen, or a mixture of oxygen with inert gas, such as air or oxygen-enriched air. The proportion of oxygen in the treating gas may range widely, e.g., from about 2 to 100 mole percent, but generally will be at least about 15%.

The removal of iron and vanadium contaminants in the form of their volatile chlorides may be accomplished by chlorinating the catalyst after sulfidation. This conversion to chloride, as described in copending application Serial No. 849,199, filed October 28, 1959, now abandoned, preferably makes use of chlorination at an elevated temperature wherein the catalyst composition and structure is not materially armed by the treatment and a substantial amount of the poisoning metals content is converted to chlorides. The conversion to chloride takes place preferably after sulfidation, if sulfidation is performed.

The chlorination takes place at a temperature of at least about 300° F., preferably about 550 to 650° F., with optimum results being obtained close to about 600° F. If the temperature of the chlorination is increased materially beyond 1000° F., increasing attack on the catalyst base is observed, that is, the percent demetallization will be increased slightly at the expense of a loss of catalyst components such as alumina. The chlorination, particularly when conducted in the lower temperature ranges, e.g., below about 550° F., is effective for conversion to chlorides of the metals. It may be followed by a purge with an inert gas such as nitrogen or flue gas for instance at about 550° F. to 1000° F. to complete volatilization and removal of chlorides such as vanadium oxychloride and/or vanadium tetrachloride formed in the chlorination step.

The chlorinating reagent is a vapor which contains chlorine, preferably in combination with carbon or sulfur. Such reagents include molecular chlorine as well as the chlorine substituted light hydrocarbons, such as carbon tetrachloride, which may be used as such or formed in situ by the use of, for example, a vaporous mixture of chlorine gas with low molecular weight hydrocarbons such as methane, n-pentane, etc. Also, it has been found that a mixture of the carbon or sulfur chlorinating reagent with a gas, such as molecular chlorine or HCl which can supply additional chlorine, is effective in reducing the amount of chlorinating reagent required for effective conversion of vanadium to its volatile chlorides. Molecular chlorine is considerably less expensive than carbon tetrachloride so that a gaseous mixture of the two is a preferred chlorinating reagent. The presence of molecular chlorine also seems to have the advantageous effect of keeping the vanadium in its higher, more volatile valence state; that is, as vanadium oxytrichloride or vanadium tetrachloride; vanadium trichloride is relatively non-volatile. Since either molecular chlorine or HCl alone has a relatively less effect in chlorinating the catalysts, it is theorized that the presence of these auxiliary gases serves mainly to regenerate the carbon or sulfur chlorinating reagent in situ.

Thionyl chloride, carried by nitrogen gas, is a chlorinating reagent which gives comparable results to those using $CCl_4$. In addition, sulfur monochloride, with or without elemental chlorine, appears to be advantageous for use as a chlorinating reagent, sulfur monochloride being considerably less expensive than $CCl_4$. Sulfur dichloride also shows advantageous properties, since it may be supplied as a liquid to the chlorination procedure and upon vaporization will give a mixture of sulfur monochloride and chlorine.

The chlorinating agent is usually essentially anhydrous, that is, it has no separate water phase when in liquid form. As the amount of water in the chlorinating agent increases, additional time and/or chlorinating agent may be required to obtain a given amount of metal removal. This inhibiting effect is also evident when water is present in the catalyst, so that it is preferred that the catalyst contain less than about 1 or 2% volatile matter at 1000° C. A mixture containing about 10 to 15% CCl₄ can be made by bubbling chlorine gas at room temperature through a tower containing CCl₄. A chlorinating gas comprising about 1–30 weight percent chlorine, based on the catalyst, together with 1% or more $S_2Cl_2$ gives good results. Preferably such a gas contains about 1–5% $Cl_2$ and about 1.5% $S_2Cl_2$. A pressure of about 0–100 or more p.s.i.g., preferably 0–15 p.s.i.g. may be maintained in chlorination, the contacting lasting for at least about five minutes, preferably about 15 minutes to an hour, but shorter or longer reaction periods may be possible or needed, for instance, depending on the linear velocity of the chlorinating vapors. In some cases, particularly when the chlorination is performed at a temperature too low to volatilize sufficient of the chlorides, the chlorination treatment may be followed, or interrupted, by a purge of the catalyst with an inert gas, as described above. Also, since hydrogenation preferably follows the chlorination, the hydrogenating vapors may perform part or all of the purge.

After carbonyl removal, the catalyst is conducted to a hydrocarbon conversion system. Prior to reusing the catalyst in the conversion operation it can be calcined, say at temperatures usually in the range of about 700 to 1300° F. conveniently by addition to the cracking unit catalyst regenerator. A fluidized solids technique is recommended for these vapor contact processes as a way to shorten the time requirements. After the available catalytically active poisoning metal has been removed in any removal procedure, further reaction time has relatively little effect on the catalytic activity of the depoisoned catalyst, although further metals content may be removed by repeated or other treatments.

The catalyst to be treated may be removed from a hydrocarbon conversion system—that is, the stream of catalyst which in most conventional procedures is cycled between conversion and regenerating operations—before the poison content reaches about 5000 to 10,000 p.p.m., the poisoning metals being calculated as their common oxides. Generally, at least about 250 or 500 p.p.m. of poisoning metal will be accumulated on the catalyst before demetallization is warranted. A small portion of the catalyst is preferably removed from the hydrocarbon conversion system and given the oxygen or hydrogen treatment after the conventional oxidation regeneration which serves to remove carbonaceous deposits. The treatment of this invention is effective despite the presence of a small amount of carbon on the treated catalyst, but preferably the regeneration is continued until the catalyst contains not more than about 0.5% carbon before a subsequent oxygen treatment. Where the catalyst is subjected to the oxygen treatment before it is substantially carbon free, the length of oxygen treatment, is reckoned from the time that the catalyst reaches the substantially carbon-free state, that is, the state where little, if any, carbon is burned even when the catalyst is contacted with oxygen at temperatures conducive to combustion.

In practicing one embodiment of this invention at the refinery, a portion of the poisoned catalyst is removed from the hydrocarbon conversion system after being regenerated, is given a high temperature treatment with an oxygen-containing gas at a temperature and for the length of time found to be sufficient to increase vanadium removal without damaging the catalyst, then the catalyst is maintained in a hydrogen sulfide or a hydrogen sulfide-inert gas mixture for one to three hours at temperatures approximating 1050° F. The sulfiding gas is purged from the catalyst by an inert gas, perhaps at a cooler temperature, then chlorinated in the temperature range outlined, subjected to hydrogen at an elevated temperature and then subjected to carbon monoxide at the lower temperature. The treated catalyst can be returned to the unit, for example, to the regenerator, as make-up catalyst, reducing greatly the new catalyst requirement. The amount of Ni, V or Fe removed in practicing the procedures outlined or the proportions of each which are removed may be varied by proper choice of treating conditions. It may prove necessary, in the case of very severely poisoned catalysts, to repeat the treatment to reduce the metals to an acceptable level, perhaps with variations where one metal is greatly in excess. For example, when nickel and/or iron are the principal metals to be removed, the hydrogenation and carbonylation, preferably with prior sulfiding, will serve to give an improved activity pattern to the catalyst. Where the removal of vanadium as well as iron and nickel is required, chlorination is employed before hydrogenation, again preferably after sulfiding. A preliminary oxygen treatment improves the vanadium removal effect of chlorination, whether or not the oxygen treatment is followed by sulfidation.

The frequency of treatment and the fraction of catalyst inventory treated will be dependent on the severity of the metal problem at the unit in question. The apparatus used to perform the process of the invention may be suitable for conducting part or all of the procedures with fluidized beds of finely divided catalyst in the various operations. When fluidized manipulations are to be used, the various gas or vapor treating agents described may be supplemented with inert fluidizing gases, such as nitrogen, where the flow of active gas is not sufficient for fluidization.

EXAMPLES

The following examples are illustrative of the invention but should not be considered limiting.

*Example I*

A "Nalcat" synthetic gel silica-alumina fluid-type cracking catalyst composed of about 25% $Al_2O_3$, substantially the rest $SiO_2$, was used in a commercial catalytic cracking conversion unit, using conventional fluidized catalyst techniques, including cracking and air regeneration to convert a feedstock (A) comprising a blend of Wyoming and Mid-Continent gas oils containing about 1.2 p.p.m. $V_2O_5$, 1.0 p.p.m. Fe, 0.3 p.p.m. NiO and about 2 weight percent S. This gas oil blend had a gravity (API) of 24°, a carbon residue of about 0.3 weight percent and a boiling range of about 500 to 1000° F. When this catalyst had a vanadium content of 4320 p.p.m., measured as $V_2O_5$, 327 p.p.m. NiO and 0.320% Fe, a sample was removed from the cracking system after regeneration. A batch of this base catalyst No. 1 sample, subjected to magnetic flux for iron removal, was used to test-crack a petroleum hydrocarbon East Texas gas oil fraction (feedstock B) having the following approximate characteristics:

| | |
|---|---:|
| IBP (° F) | 490–510 |
| 10% | 530–550 |
| 50% | 580–600 |
| 90% | 650–670 |
| EP | 690–710 |
| Grav. (API) _____degrees__ | 33–35 |
| Visc. (SUS) at 100° F. _____ | 40–45 |
| Aniline point _____° F__ | 170–175 |
| Pour point _____° F__ | 35–40 |
| Sulfur _____percent__ | 0.3 |

The results of the cracking are given in Table I below. A sample of this base catalyst No. 1 is dried in a muffle furnace for three hours at 1050° F. This dry catalyst is then reduced for three hours at 1300° F. with hydrogen at atmospheric pressure. The catalyst is then cooled to 120° F. under a hydrogen purge and then is treated for two hours with CO at about 200° F. and 400 p.s.i.g. Analysis of the treated catalyst shows an 11.3% removal of nickel and a 5% removal of iron. Use of this sample in test cracking of feedstock B gives significantly improved results.

*Example II*

A 1500 g. sample of catalyst No. 2, a regenerated equilibrium 15% alumina silica based cracking catalyst which contained 245 p.p.m. NiO, 2390 p.p.m. $V_2O_5$ and 0.404% Fe, is sulfided with hydrogen sulfide at 900° F. and 100 p.s.i.g. for three hours. A 60 g. sample of this catalyst is reduced at 900° F. and 700 p.s.i.g. for three hours with 0.52 ft.$^3$/hr. hydrogen. This reduced catalyst is then cooled to 180° F. and treated at this temperature with CO for six hours at 800 p.s.i.g. Analysis of the treated catalyst shows a 23% reduction in nickel and a 12% reduction in iron content.

*Example III*

A 3000 g. sample of poisoned catalyst No. 1 was subjected to air at 1300° F. for four hours. This catalyst sample was then cooled to 1175° F. where it was sulfided with $H_2S$ for 1½ hours. The removal of the vanadia and iron was next accomplished by treating this catalyst at 600° F. with a vaporous mixture which provided 5% $CCl_4$ and 2% $Cl_2$, based on the weight of the catalyst, for 1 hour. The catalyst was next treated with wet hydrogen at 900° F. for six hours. This treatment served to reduce nickel chloride on the catalyst and also served to purge residual chlorine from the catalyst, lowering the $Cl_2$ content from 1.3% to less than 0.005%. The reduced catalyst was purged for sixty minutes with dry hydrogen at 900° F. to remove excess moisture. It was then subjected to a carbon monoxide treat at 180° F. and 800 p.s.i.g. for 6 hours to remove nickel from the catalyst surface as a carbonyl. The following table gives analytical data resulting from the above treatment and from the use of this demetallized catalyst in test cracking feedstock B.

TABLE I

| | Base catalyst No. 1 | After chlorination | Final catalyst |
|---|---|---|---|
| P.p.m. NiO | 327 | 327 | 81 |
| P.p.m. $V_2O_5$ | 4,320 | 3,202 | 3,202 |
| Percent Fe | 0.288 | 0.218 | 0.218 |
| Percent $Cl_2$ | 0.008 | 1.3 | 0.005 |
| Test Cracking: | | | |
| Relative Activity | 34.2 | ---------- | 47.0 |
| Gas Factor | 1.62 | ---------- | 1.22 |
| Coke Factor | 1.25 | ---------- | 1.01 |
| Gas Gravity | 1.10 | ---------- | 1.31 |

As pointed out, a major advantage of the process of the invention is that the need for contact of the catalyst with aqueous media heretofore proposed for demetallization can be eliminated. Thus alumina losses which may stem from such contacting are prevented, as well as great heat losses due to the use of large quantities of water.

We claim:

1. A method for removing nickel from a synthetic gel, silica-based catalyst which has been poisoned by contamination with nickel due to use of said catalyst in a cracking system producing gasoline and wherein catalyst is cycled between a cracking zone, in which the catalyst is contacted at an elevated temperature with a hydrocarbon feedstock heavier than gasoline containing said nickel contaminant which deposits on the catalyst, and a regeneration zone, in which carbon is oxidized and thereby removed from the catalyst, which comprises bleeding a portion of nickel contaminated catalyst from the cracking system, reducing a substantial amount of nickel to the elemental state by contact of bled catalyst at an elevated temperature of about 800–1600° F. with hydrogen, forming nickel carbonyl from elemental nickel and removing said carbonyl by contact of the catalyst with carbon monoxide at a substantially lower temperature and returning resulting denickelized catalyst to a cracking system.

2. The method of claim 1 in which the catalyst is silica-alumina.

3. The method of claim 1 in which hydrogen treatment is at a temperature of about 800 to 1600° F. and carbon monoxide treatment takes place at a temperature of about ambient temperature to 300° F.

4. The method of claim 1 which includes the step of sulfiding the catalyst by contact with a vaporous sulfiding agent at an elevated temperature before treatment with hydrogen to enhance nickel removal.

5. The method of claim 4 in which sulfiding is performed by contact of the catalyst with $H_2S$ at about 700 to 1600° F.

6. The method of claim 5 in which the catalyst is silica-alumina.

7. A method for removing metal from a synthetic gel, silica-based catalyst which has been poisoned by contamination with iron, nickel and vanadium due to use of said catalyst in a cracking system producing gasoline and wherein catalyst is cycled between a cracking zone, in which the catalyst is contacted at an elevated temperature with a hydrocarbon feedstock heavier than gasoline containing said metal contaminants which deposit on the catalyst, and a regeneration zone, in which carbon is oxidized and thereby removed from the catalyst, which comprises bleeding a portion of metal contaminated catalyst from the cracking system, contacting bled catalyst with an essentially anhydrous chlorinating vapor to form and remove iron and vanadium chloride, reducing a substantial amount of nickel to the elemental state by contact of bled catalyst at an elevated temperature of about 800–1600° F. with hydrogen, forming nickel carbonyl from elemental nickel and removing said carbonyl by contact of the catalyst with carbon monoxide at a substantially lower temperature and returning resulting demetallized catalyst to a cracking system.

8. The method of claim 7 in which the chlorination is performed at a temperature of up to about 1000° F.

9. The method of claim 7 in which a treatment with molecular oxygen-containing gas at a temperature of about 1200 to 1600° F. is given to the substantially carbon-free catalyst before chlorination to enhance vanadium removal.

10. The method of claim 9 in which the catalyst is sulfided by contact with a vaporous sulfiding agent at an elevated temperature before chlorination.

11. The method of claim 10 in which sulfiding is performed by contact of the catalyst with $H_2S$ at about 700 to 1600° F.

12. The method of claim 11 in which the catalyst is silica-alumina.

13. A method for removing metal from a synthetic gel, silica-based catalyst which has been poisoned by contamination with iron, nickel and vanadium due to use of said catalyst in a cracking system producing gasoline and wherein catalyst is cycled between a cracking zone, in which the catalyst is contacted at an elevated temperature with a hydrocarbon feedstock heavier than gasoline containing said metal contaminants which deposit on the catalyst, and a regeneration zone, in which carbon is oxidized and thereby removed from the catalyst, the steps which comprise bleeding a portion of metal contaminated catalyst from the cracking system, contacting bled, substantially carbon-free catalyst with a gas containing molecular oxygen at a temperature of at least about 1200° F. to 1600° F. to increase subsequent vanadium removal from said catalyst, sulfiding poisoning metal containing catalyst by contact of the oxygen-treated catalyst with $H_2S$ at about 700 to 1600° F., subjecting the catalyst to an essentially anhydrous chlorinating vapor at a temperature up to about 1000° F. to form and remove iron and vanadium chloride, contacting the chlorinated catalyst with hydrogen at a temperature of about 800 to 1600° F. to reduce nickel to the elemental state, contacting the hydrogenated catalyst with carbon monoxide at a temperature of about ambient temperature to 300° F. to form and flush off nickel carbonyl, and returning the catalyst to the hydrocarbon conversion system.

14. The method of claim 13 in which oxygen gas contact is maintained for about 1 to 24 hours, $H_2S$ contact is maintained for about 1 to 24 hours, chlorinating vapor contact is maintained for about 5 to 60 minutes, hydrogen contact is maintained for about 1 to 24 hours and carbon monoxide contact is maintained for about 1 to 6 hours.

15. The method of claim 13 in which the catalyst is silica-alumina.

16. The method of claim 13 in which the catalyst is silica-magnesia.

References Cited by the Examiner

UNITED STATES PATENTS

| | | | |
|---|---|---|---|
| 2,267,736 | 12/41 | Ipatieff | 252—411 |
| 2,276,921 | 3/42 | Brown | 252—411 X |
| 2,380,731 | 7/45 | Drake | 252—413 |
| 2,481,253 | 9/49 | Synder | 252—415 X |
| 2,488,718 | 11/49 | Forrester | 252—411 X |
| 2,575,258 | 11/51 | Corneil et al. | 252—411 X |

FOREIGN PATENTS 596,177  4/60  Canada.

MAURICE A. BRINDISI, *Primary Examiner.*

JULIUS GREENWALD, *Examiner.*